(12) United States Patent
Kishima et al.

(10) Patent No.: US 6,831,790 B2
(45) Date of Patent: Dec. 14, 2004

(54) OPTICAL ELEMENT, METHOD FOR PRODUCING THE SAME, AND OPTICAL PICKUP

(75) Inventors: Koichiro Kishima, Kanagawa (JP); Akira Kouchiyama, Kanagawa (JP)

(73) Assignee: Sony Corporation (JP)

( * ) Notice: Subject to any disclaimer, the term of this patent is extended or adjusted under 35 U.S.C. 154(b) by 393 days.

(21) Appl. No.: 09/933,151

(22) Filed: Aug. 21, 2001

(65) Prior Publication Data

US 2002/0030897 A1 Mar. 14, 2002

(30) Foreign Application Priority Data

Aug. 22, 2000 (JP) .................................... P2000-251240

(51) Int. Cl.⁷ .............................. G02B 3/08; G11B 7/00
(52) U.S. Cl. ...................... 359/642; 359/355; 359/661; 359/719; 359/743; 359/803; 359/819; 369/112.23; 369/112.25
(58) Field of Search ................................ 359/642, 355, 359/661, 719, 743, 803, 819; 369/112.23, 112.25

(56) References Cited

U.S. PATENT DOCUMENTS

| | | | | |
|---|---|---|---|---|
| 5,257,145 A | * | 10/1993 | Kanazawa et al. ........... | 359/819 |
| 5,665,957 A | * | 9/1997 | Lee et al. ................. | 369/53.23 |
| 5,805,355 A | * | 9/1998 | Natsuno ..................... | 359/719 |
| 5,975,882 A | * | 11/1999 | Nomura et al. ............... | 451/42 |
| 5,982,565 A | * | 11/1999 | Nomura et al. .............. | 359/819 |
| 5,995,304 A | * | 11/1999 | Nomura et al. .............. | 359/726 |
| 6,008,955 A | * | 12/1999 | Nomura et al. .............. | 359/719 |
| 6,034,827 A | * | 3/2000 | Nomura et al. .............. | 359/811 |
| 6,052,232 A | * | 4/2000 | Iwaki ......................... | 359/642 |
| 6,144,500 A | * | 11/2000 | Iwaki et al. ................. | 359/719 |
| 6,188,528 B1 | * | 2/2001 | Yamada et al. ............. | 359/719 |
| 6,219,191 B1 | * | 4/2001 | Iwaki et al. ................. | 359/811 |
| D480,384 S | * | 10/2003 | Fuse ......................... | D14/217 |
| 2002/0027864 A1 | * | 3/2002 | Kishima et al. ........ | 369/112.24 |

OTHER PUBLICATIONS

"Usefulness of Magnetic Neutral Loop Discharge Plasma in Plasma Processing" Tsuboi, et al., Jpn. J. Appl. Phys. vol. 34 (1995), pp. 2476–2481.

"Review of Inductively Coupled Plasmas for Plasma Processing", J. Hopwood, Plasma Sources Sci. Technol. 1, 1992, pp. 109–116.

"High Rate and Highly Selective SiO2 Etching Employing Inductively Coupled Plasma", Fukasawa, et al., Jpn. J. Appl. Phys. vol. 33, 1994, pp. 2139–2144.

* cited by examiner

Primary Examiner—Evelyn A. Lester
(74) Attorney, Agent, or Firm—Rader, Fishman & Grauer PLLC; Ronald P. Kananen

(57) ABSTRACT

An optical element having a substrate formed by an optical material and able to improve mechanical strength, wherein the substrate has a convex part functioning as a convex lens, a flat part positioned around the convex part, and an outer circumference part positioned around the flat part. The thickness of the substrate at the outer circumference part is greater than that of the substrate at the flat part.

17 Claims, 11 Drawing Sheets

OPTICAL ELEMENT, METHOD FOR PRODUCING THE SAME, AND OPTICAL PICKUP

BACKGROUND OF THE INVENTION

1. Field of the Invention

The present invention relates to an optical element, a method for producing the same, and an optical pickup comprising the optical element.

2. Description of the Related Art

Recently, it is demanded to make an optical disc storage with medium high density. Therefore, in optical disc apparatuses, research and development have been underway for shortening the wavelength of a light source and for enlarging the numerical aperture (NA) of a reproduction optical disc system. Further, it is desired to increase the transfer rate of data in such the reproduction optical disc systems.

When shortening the wavelength of the light source and enlarging the NA of the reproduction optical disc system, in addition to the fact that the size of an optical spot becomes small, the focal depth becomes shallower, so it is desired to reduce the focus servo error. Further, a data recording width (track width) of the optical disc storage medium becomes narrower, so it is desired to reduce the tracking servo error.

For increasing the data transfer rate, it is desired to make the bandwidth of an actuator used for the focus servo and tracking servo higher. As a result, two improvements are desired for servo characteristics: reduction of the remaining amount of error and raising the bandwidth. An actuator can be improved in its servo characteristics by reducing the weight of the actuator.

Figure 1A:
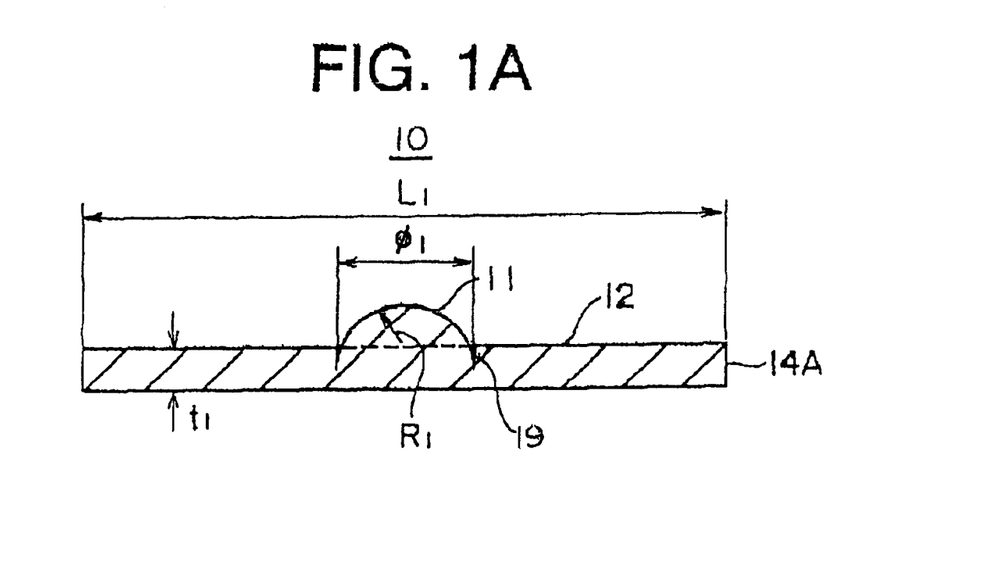
FIG. 1A is a sectional view illustrating an optical element as the related art of the present invention and FIG. 1B is a plane view of the optical element in FIG. 1A.
Figure 1B:
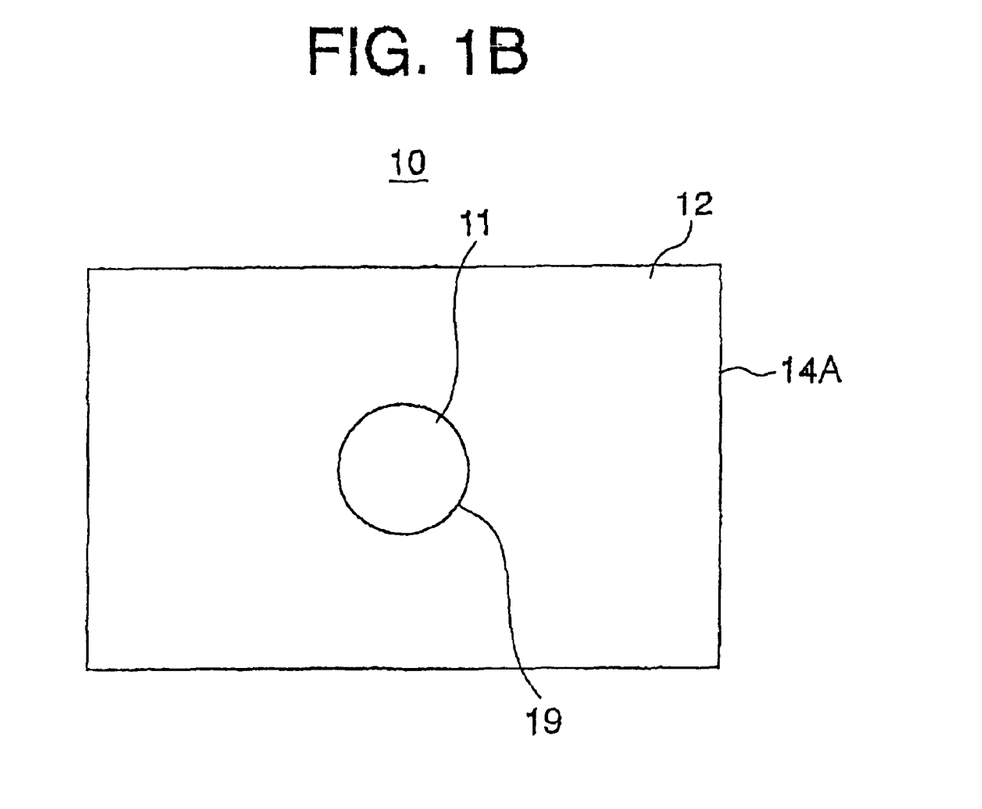

FIG. 1A is a sectional view illustrating an optical element as a related art and FIG. 1B is a plane view of the optical element in FIG. 1A.

This optical element 10 has a substrate 14A formed by an optical material and having a thickness $t_1$. The substrate 14A has a convex part 11 configuring a convex lens and a flat part 12 positioned around the convex part 11.

The optical element 10 can be formed by heat treating a circular mask layer with a Radius R formed on the front surface of a planar optical material to form it into a lens shape by surface tension, then etching the planar optical material so that the lens shape is transferred to the optical material.

At the outer circumference of the convex part 11 is formed a groove 19 called a "trench" formed when transferring the shape by the etching. The groove 19 clearly separates the convex part 11 and the flat part 12.

In the optical element 10 in FIGS. 1A and 1B, parts other than the convex part 11 are etched away to give a thin planar shape.

When using this optical element 10 in combination with other optical elements, care must be taken that an optical path in other combined optical elements is maintained.

Figure 2A:
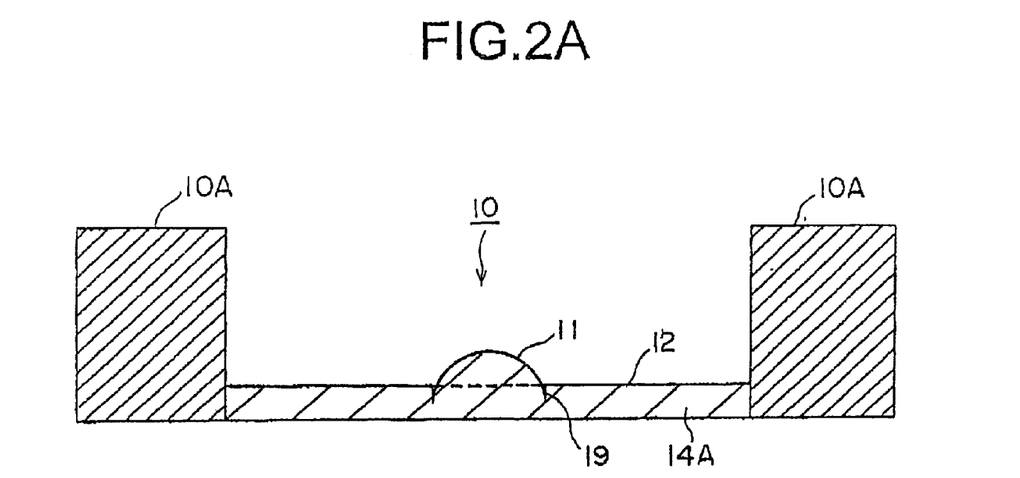
FIGS. 2A and 2B are sectional views of the optical element in FIGS. 1A and 1B and a lens holder.
Figure 2B:
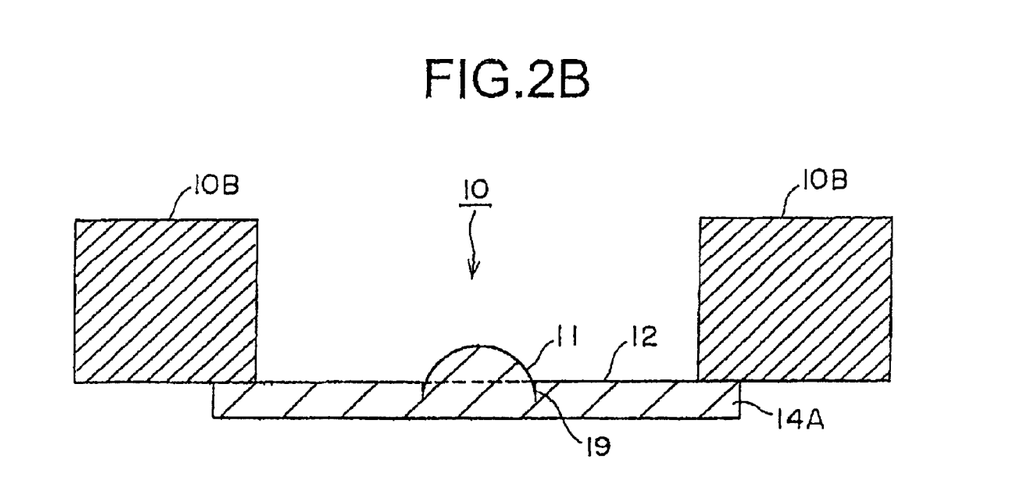

FIGS. 2A and 2B are sectional views of the optical element 10 in FIGS. 1A and 1B and a lens holder thereof. FIG. 2A shows a case when clamping the circumferential edge of the flat part 12 of the optical element 10 by a lens holder 10A. FIG. 2B shows a case when clamping an upper surface of the flat part 12 of the optical element 10 by a lens holder 10B.

As shown in FIGS. 2A and 2B, it is necessary to enlarge the flat part 12 in order to mount the optical element 10 in FIGS. 1A and 1B on the lens holders 10A and 10B.

Further, considering deviation of position at the time of bonding and a squeezing out of excess adhesive, it is necessary to enlarge the flat part 12 not only in the case when using the optical element 10 in combination with other optical elements. For example, when the convex part 11 has an effective diameter (diameter) of a convex lens of about 200 μm and has a radius of curvature of the convex lens of about 150 μm, the thickness of the flat part 12 becomes about 50 μm or less. If assuming the sum of tolerance of the positioning accuracy in the bonding process and the amount of the adhesive squeezed out to be about 500 μm, the convex lens ends up being positioned on a thin plate of about 50 μm thickness and about 500 μm length.

Therefore, improvement of mechanical strength is desired for the optical element as shown in FIGS. 1A and 1B. Further, because the flat part 12 is thin, resonance due to vibration in a thickness direction easily occurs. Therefore, it is desired to make the structure difficult to resonate.

SUMMARY OF THE INVENTION

An object of the present invention is to provide an optical element having a substrate formed by an optical material, with the improved mechanical strength and free from a critical resonance.

Another object of the present invention is to provide an optical pickup having the optical element.

Still another object of the present invention is to provide a method for producing the optical element with efficiency and at a high accuracy.

According to a first aspect of the present invention, there is provided an optical element having a substrate formed by an optical material, wherein the substrate has a convex part functioning as a convex lens, a flat part positioned around the convex part, and an outer circumference part positioned around the flat part, the thickness of the outer circumference part being greater than that of the flat part.

Preferably, the thickness of the outer circumference part is thicker than that of the convex part.

Preferably, the substrate has a first groove formed at a boundary between the convex part and the flat part, for defining a region of the convex part.

Preferably, the substrate has a second groove formed at a boundary between said flat part and said outer circumference part, for defining a region of said flat part.

Preferably, the optical material comprises fused silica.

Preferably, the surface of the outer circumference part is flat or approximately flat.

Preferably, a plurality of steps are formed at the outer circumference part, and the thickness of the substrate at an outer side step is thicker than that of the substrate at an inner side step.

According to the first aspect of the present invention, there is provided an optical element having a substrate formed by an optical material, wherein the substrate has a convex part functioning as a convex lens, a flat part positioned around the convex part, an outer circumference part positioned around the flat part, a first groove formed at a boundary between the convex part and the flat part, for defining a region of the convex part, and a second groove formed at a boundary between the flat part and the outer circumference part, for defining a region of the flat part, wherein a thickness of the outer circumference part is greater than that of the flat part, both the flat part and the outer circumference part have flat shapes in the thickness direction, and the convex part, the flat part, and the outer circumference part are integrated in a unit by the substrate.

According to the first aspect of the present invention, there is provided an optical element having a substrate formed by an optical material, wherein the substrate has a convex part functioning as a convex lens, a flat part positioned around the convex part, an outer circumference part positioned around the flat part, and a groove formed at a boundary between the convex part and the flat part, for defining a region of the convex part, wherein a thickness of the outer circumference part is greater than that of the convex part, both the flat part and the outer circumference part have flat shapes in the thickness direction, and the convex part, the flat part, and the outer circumference part are integrated in a unit by the substrate.

According to the first aspect of the present invention, there is provided an optical element having a substrate formed by an optical material, wherein the substrate has a convex part functioning as a convex lens, a flat part positioned around the convex part, a first outer circumference part positioned around the flat part, a second outer circumference part positioned around the first outer circumference part, a third groove formed at a boundary between the convex part and the flat part, for defining a region of the convex part, and a fourth groove formed at a boundary between the flat part and the first outer circumference part, for defining a region of the flat part, wherein the thickness of the first and second outer circumference parts are greater than that of the flat part and the thickness of the second outer circumference part is greater than that of the first outer circumference part, all the flat part and the first and second outer circumference parts have flat shapes in the thickness direction, and the convex part, the flat part, and the first and second outer circumference parts are integrated in a unit by the substrate.

According to a second aspect of the present invention, there is provided a method for producing an optical element comprising the steps of forming a first mask layer and a second mask layer surrounding the first mask layer on a substrate formed by an optical material, heat treating the first mask layer to form it into a convex lens shape, and etching the substrate to transfer the convex lens shape of the first mask layer to the substrate.

Preferably, in the step of forming the first and second mask layers, the first and second mask layers are formed by patterning a mask layer formed by a photosensitive material on the substrate.

Preferably, in the step of heat treating the first mask layer to form it into a convex lens shape, the heat treatment temperature is higher than a glass transition temperature of the first mask layer.

Preferably, in the step of heat treating the first mask layer to form it into a convex lens shape, the heat treatment temperature is lower than a carbonization temperature of the first mask layer.

Preferably, in the step of heat treating the first mask layer to form it into a convex lens shape, the heat treatment temperature is higher than room temperature or ordinary temperature.

Preferably, in the step of forming the first and second mask layers, the second mask layer having an opening part is formed, then the first mask layer is formed at the opening part. In this case, the second mask layer is formed by an etching-resistant material.

Preferably, the second mask layer comprises a third mask layer formed by an etching-resistant material and a fourth mask layer superposed on the third mask layer so as to cover the third mask layer on the substrate. In this case, the fourth mask layer is formed by the same material as the first mask layer.

Preferably, the substrate is formed by fused silica, the first and fourth mask layers are formed by an optically transparent material having a good characteristic for forming a thick film, and the second and third mask layers are formed by platinum.

According to a third aspect of the present invention, there is provided an optical pickup having an optical element functioning as an object lens when mounted on a recording and/or reproducing apparatus of an optical storage medium and a photodetector for receiving a reflected light beam for use in recording and/or reproduction to and from the optical storage medium, the optical element comprising a substrate formed by an optical material, the substrate comprising a convex part functioning as a convex lens, a flat part positioned around the convex part, and an outer circumference part positioned around the flat part, a thickness of the outer circumference part being thicker than that of the flat part to thereby improve mechanical strength and increase a resonance frequency.

Preferably, the thickness of the outer circumference part is thicker than that of the convex part.

Preferably, a surface of the outer circumference part is flat or approximately flat. Holding of the optical element is eased by this.

Preferably, a plurality of steps are formed at the outer circumference part and the thickness of the substrate at an outer side step is thicker than that of the substrate at an inner side step. An eclipse can be prevented thereby.

The substrate comprised of an optical material comprises a convex part functioning as a convex lens, a flat part positioned around the convex part, and an outer circumference part positioned around the flat part. Since the thickness of this outer circumference part is greater than that of the flat part, in comparison with the same thickness, the mechanical strength of the substrate can be improved and it is possible to improve the mechanical strength and reliability of the optical element.

In the optical element according to the present invention, since the outer circumference part is formed thick, it is possible to make the flat part thinner than the outer circumference part and thus increase the mechanical strength. Further, the flexural strength is also increased because of the reduction of the thin flat part, the resonance frequency in the thickness direction is heightened, and thus it is possible to make the optical element a structure resistant to resonance.

Further, in the optical element according to the present invention, it is possible to enlarge the size of the optical element due to the reduction of the thin flat part. Due to this, the allowable amount of excess adhesive squeezed out can be enlarged, so it is both possible to facilitate the mounting on a lens holder and to increase the diameter of an attachment part formed in the lens holder. The requirement on precision also can be relaxed, so it is possible to relax the requirement on precision of the lens holder mounting this optical element.

According to the method for producing the optical element according to the present invention, when forming the convex part, the thick outer circumference part can be formed without increasing or almost without increasing the steps of the process. Further, since the positioning accuracy of the patterning of the mask layer can be maintained, the convex part and the outer circumference part can be fabricated with a high positioning accuracy. As a result, the flat part positioned around the convex part can be made smaller and, for example, the flat part can be made narrower to the resolution of the material of the mask layer.

Further, according to the method for producing an optical element according to the present invention, by using an etching-resistant material for the material of the mask layer of the outer circumference part, the outer circumference part can be made thicker than the convex part and it is possible to further improve the mechanical strength and to further raise the resonance frequency.

Further, by using a stacked structure mask layer as the mask layer of the outer circumference part, it is possible to form an optical element having a multistep structure at the thick outer circumference part and possible to make the structure one in which the outer circumference part does not easily block the optical path, so the thick outer circumference part can be formed up to near the convex part and it is possible to further improve the mechanical strength and to further raise the resonance frequency.

Further, according to the optical pickup of the present invention, it is possible to provide an optical pickup having an optical element according to the above present invention.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

First Embodiment of an Optical Element

Figure 3A:
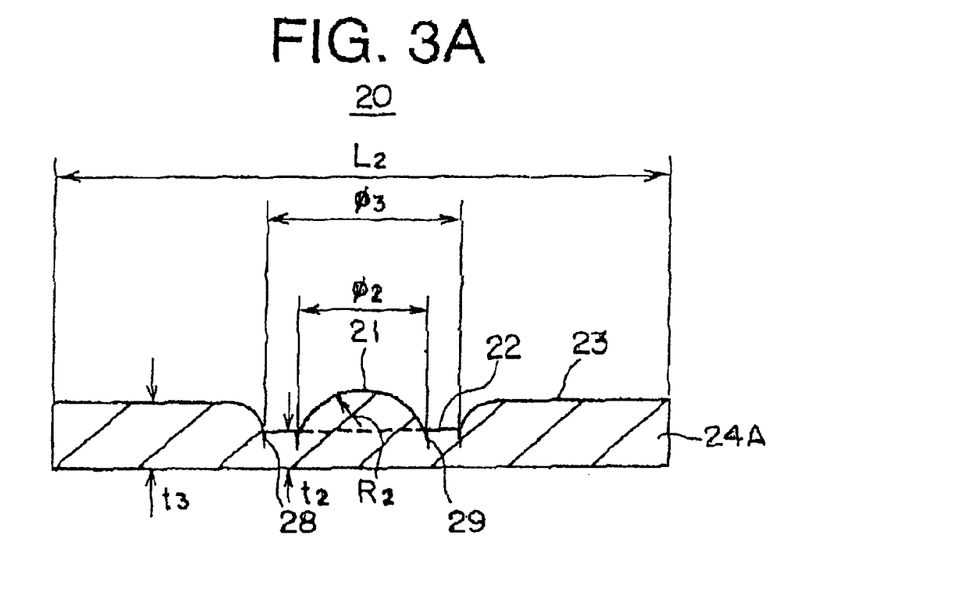
FIG. 3A is a sectional view of a first embodiment of an optical element according to the present invention and FIG. 3B is a plane view of the optical element in FIG. 3A.
Figure 3B:
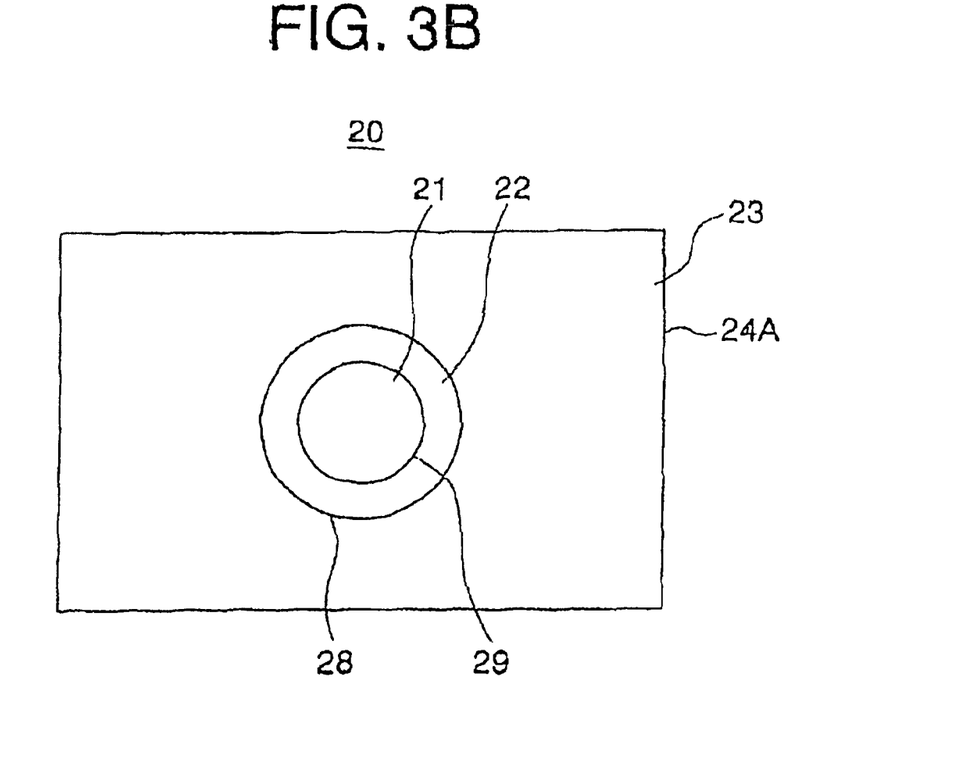

FIG. 3A is a sectional view of an embodiment of an optical element according to the present invention and FIG. 3B is a plane view of the optical element in FIG. 3A.

This optical element 20 has a substrate 24A formed by an optical material. The substrate 24A has a convex part 21 functioning as a convex lens, a flat part 22 positioned around the convex part 21, and an outer circumference part 23 positioned around the flat part 22. The optical element 20 also has a first groove (or trench) 28 clearly separating the flat part 22 and the outer circumference part 23, and a second groove (or trench) 29 clearly separating the convex part 21 and the flat part 22.

Note, the convex part 21, the flat part 22 and the outer circumference part 23 are integrated in a unit by the substrate 24A.

In this embodiment, both the flat part 22 and the outer circumference part 23 have flat shapes in the thickness direction. Accordingly, the flat part 22 can be called as an inner flat part and the outer circumference part 23 can be called as an outer flat part.

The thickness of the outer circumference part 23 is thicker than the thickness of the flat part 22, and the surface (upper surface) of the outer circumference part 23 is flat.

In this optical element 20, the convex part 21 is small, light, and high in precision. Further, the outer circumference part 23 is thicker than the flat part 22. Therefore, the thin flat part 22 becomes smaller and the mechanical strength is improved. Further, since the thin flat part 22 is small, the flexural strength is also improved, the resonance frequency of the vibration in the thickness direction of the substrate 24A is raised, and thus a structure resistant to resonance is obtained.

Further, since the optical element 20 is formed with a thick outer circumference part 23, the size of the optical element 20 can be enlarged while maintaining the mechanical strength.

For this reason, the permissible amount of adhesive squeezed out can be increased, so the mounting process on a lens holder becomes easier. Further, it is possible to increase the diameter of a part for mounting the lens holder as shown in FIGS. 2A and 2B and to ease the requirements on its precision. Therefore, the requirements on the precision of the lens holder to which the optical element 20 is mounted can be eased.

First Embodiment of Method for Producing Optical Element

Next, a method for producing the optical element will be described.

FIGS. 4A to 4D are explanatory views of a method for producing the optical element of FIGS. 3A and 3B.

Figure 4A:
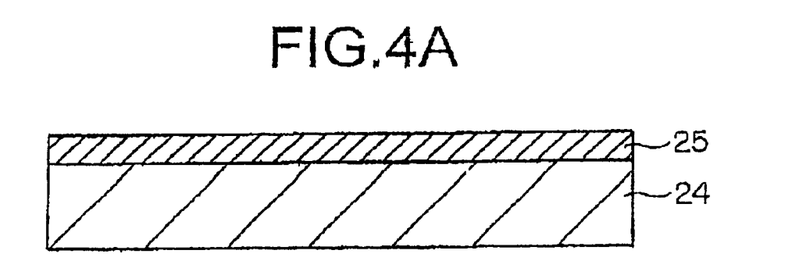
FIGS. 4A to 4D are explanatory views of a method for producing the optical element in FIGS. 3A and 3B.

In FIG. 4A, a mask layer 25 is coated onto a substrate 24 formed by an optical material such as fused silica (fused silica-based glass). The mask layer 25 is formed by a photosensitive material (or photoresist) having a good characteristic for forming a thick film such as PMER P-LA900PM made by Tokyo Ohka Kogyo Co., Ltd. or AZ PLP-30 or AZ PLP-40 made by Clariant and coated to a predetermined thickness by spin coating etc. The thickness of the mask layer 25 is about 25 $\mu$m as one example.

Figure 4B:
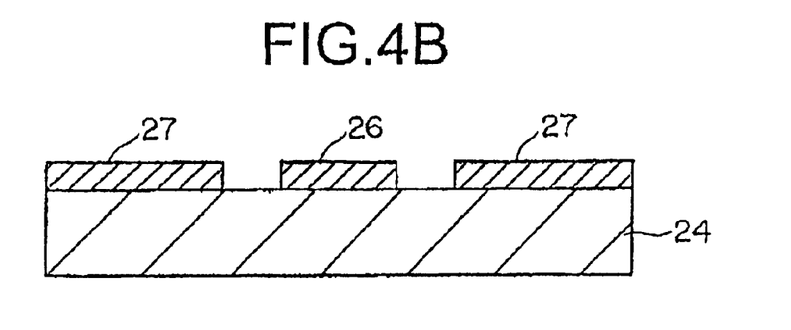

In FIG. 4B, the mask layer 25 on the substrate 24 in FIG. 4A is patterned to form a first mask layer 26 and a second mask layer 27. The mask layer 25 is patterned by exposure and development for example. The distance space between the first mask layer 26 and the second mask layer 27 is made about 50 $\mu$m as one example and the diameter of the first mask layer 26 is made about 100 $\mu$m to about 250 $\mu$m as one example.

Figure 4C:
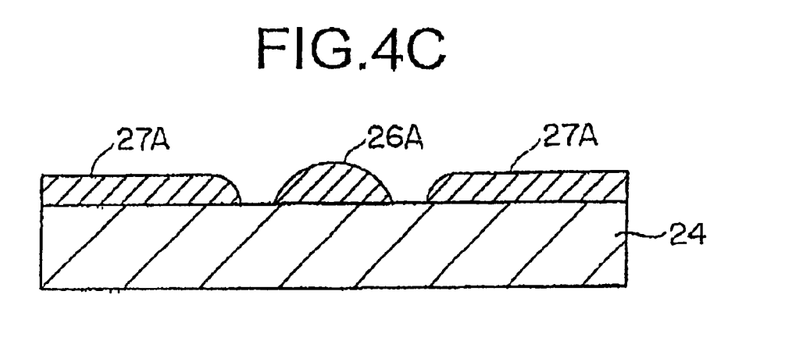

In FIG. 4C, the substrate 24 (or the mask layers 26 and 27 on the substrate 24) in FIG. 4B is heat treated to cause the mask layers 26 and 27 to deform so that their surface areas becomes smaller due to surface tension etc. and to cause them to deform to a convex shape having a gentle curved surface.

By the heat treatment, the shapes of the mask layers 26 and 27 in FIG. 4B become the shapes of the mask layers 26A and 27A in FIG. 4C. The mask layer 26A has a circular convex shape (a convex lens shape).

Figure 4D:
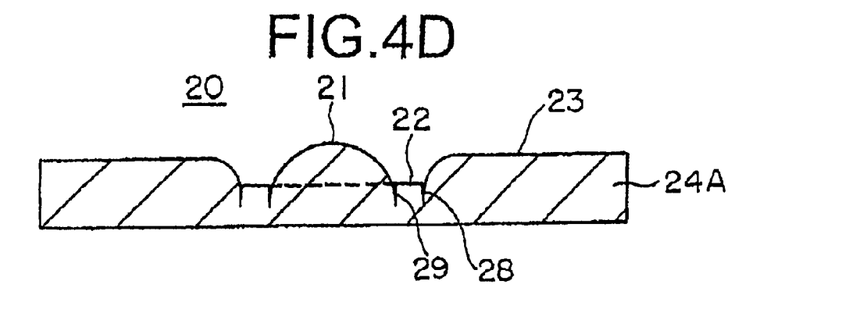

In FIG. 4D, the shapes of the mask layers 26A and 27A in FIG. 4C are transferred to the substrate 24 to form the substrate 24A and thus form the optical element 20. For example, reactive ion etching (RIE) or other etching is used to transfer the shapes of the mask layers 26A and 27A to the substrate 24 and thus form the optical element 20.

The convex part 21 is formed by transferring the shape of the mask layer 26A, the flat part 22 is formed by transferring the shape between the mask layers 26A and 27A, and the outer circumference part 23 is formed by transferring the shape of the mask layer 27A. The surface of the outer circumference part is flat or approximately flat. The groove 29 is formed at an outer circumference of the convex part 21, while the groove 28 is formed at an outer circumference of the flat part 22. The grooves 28 and 29 clearly define the convex part 21, the flat part 22, and the outer circumference part 23.

The etching for forming the convex part 21 is, for example, performed by a plasma etching apparatus using a high density plasma source called a magnetic neutral loop discharge plasma (NLD) apparatus. For the NLD apparatus, H. Tsuboi, M. Itoh, M. Tanabe, T. Hayashi, and T. Uchida: *Jpn. J. Appl. Phys.* 34 (1995), 2476 may be referred to.

Alternatively, the etching is performed by a plasma etching apparatus using a high density plasma source called an inductively coupled plasma (ICP) apparatus. Note that for the ICP apparatus, J. Hopwood, Plasma Source, *Sci. & Technol.* 1 (1992) 109. and T. Fukusawa, A. Nakamura, H. Shindo, and Y. Horiike: *Jpn. J. Appl. Phys.* 33 (1994), 2139 may be referred to.

According to the producing method shown in FIGS. 4A to 4D, it is possible to form the convex part 21 functioning as a convex lens and form the thick outer circumference part 23. Further, since the precision of the patterning of the mask layer can be maintained high, the convex part 21 and the outer circumference part 23 can be produced at a high positional accuracy. As a result, the thin flat part 22 positioned around the convex part 21 can be made smaller and, for example, the flat part can be made narrower to the resolution of the photosensitive material.

Further, the optical element 20 has the thick outer circumference part 23 formed around the flat part 22. By using the producing method of FIGS. 4A to 4D, it is possible to produce an optical element having a shape difficult to form by a glass mold method.

In the producing method in FIGS. 4A to 4D, as one example, the mask layer 25 is made by a material having a glass transition temperature (Tg point) of about 45° C. to about 55° C. such as PMER P-LA900PM made by Tokyo Ohka Kogyo Co., Ltd. or AZ PLP-30 or AZ PLP-40 made by Clariant and heat treated in a range of about 110° C. to about 150° C.

Further, in order to enable the first mask layer 26 to deform roundly by the heat treatment to an extent giving an optically smooth surface, the material of the mask layer 25 is made a material with a Tg point lower than the heat treatment temperature.

Furthermore, when forming the shape of the first mask layer 26 on the substrate 24 by dry etching or and 27A not to change in quality after the heat treatment. Therefore, the heat treatment temperature is made a temperature at which the mask layers 26A and 97A do not change in quality. For example, the heat treatment temperature is made a temperature lower than a carbonization temperature of the first mask layer 26.

If the mask layers 26 and 27 deform in a holding state of the substrate 24 on which the mask layers 26 and 27 are formed, reproduction of the process (reproducibility) becomes difficult. Further, if the mask layers 26 and 27 deform in the dry etching process, reproduction of the process becomes difficult.

For this reason, the material of the mask layer 25 is made a material having a Tg point higher than the storage temperature (room temperature or ordinary temperature) or processing temperature (near room temperature or near ordinary temperature).

Generally, the Tg point is the temperature indicating the boundary at which the material becomes a glass state, i.e., a state not having a determined structure and able to flow, so considering the stability of the process, it is desired that the heat treatment temperature be a temperature higher than the Tg point by a certain margin.

That is, in order to cause mask layer 26 to deform by the heat treatment so that its surface area becomes smaller (make the mask layer 26 a fluid state by the heat treatment and make the mask layer 26 deform by the surface tension of the mask layer 26), it is desired for the heat treatment temperature to be made 10's of degrees centigrade higher than the Tg point.

As one example, by making the heat treatment temperature a temperature at least about 40° C. higher than the Tg point, it is possible to cause the mask layer 26 to roundly deform within one hour for example and thus possible to produce the optical element 20 efficiently.

Note that, from a similar viewpoint, in the relation between the storage temperature or the processing temperature and the Tg point, the difference between the storage temperature or the processing temperature and the Tg point should be within several 10's of degrees centigrade.

Second Embodiment of Optical Element and of Method for Producing Optical Element Next, a second embodiment of an optical element and the method for producing the second optical element according to the present invention will be described with reference to FIGS. 5A to 5E.

Figure 5A:
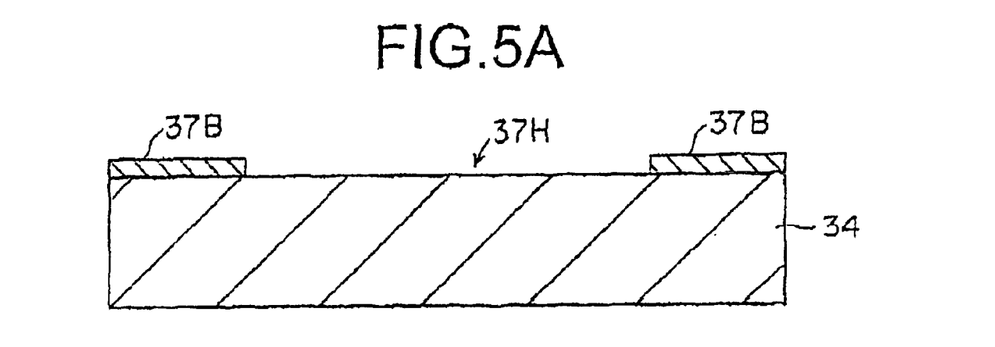
FIGS. 5A to 5E are explanatory views of a second embodiment of the method for producing an optical element according to the present invention.

In FIG. 5A, a second mask layer 37B having an opening 37H is formed on a substrate 34 formed by an optical material such as fused silica (fused silica-based glass). This second mask layer 37B is formed by an etching-resistant material and has a thickness of about 0.1 μm as one example. The second mask layer 37B may be formed for example by a metal material such as platinum or may be formed by a hard mask.

Figure 5B:
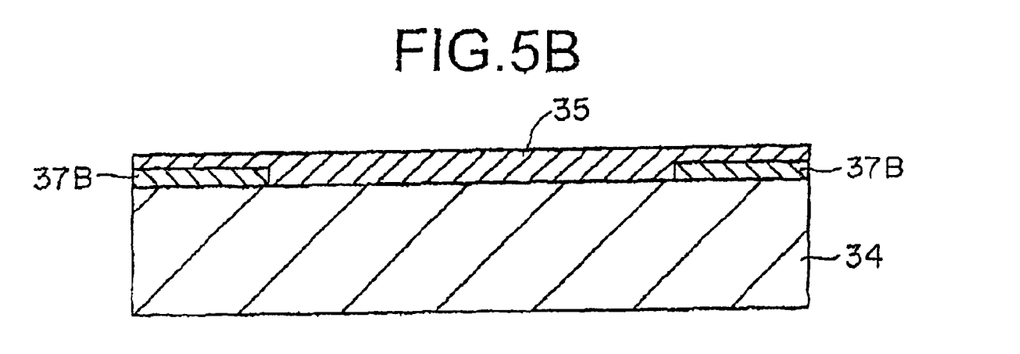

In FIG. 5B, a mask layer 35 is coated onto the substrate 34 of FIG. 5A. The mask layer 35 is formed by a photosensitive material (or photoresist) having a good characteristic for forming a thick film such as PMER P-LA900PM made by Tokyo Ohka Kogyo Co., Ltd. or AZ PLP-30 or AZ PLP-40 made by Clariant and is coated to a predetermined thickness by spin coating etc. The thickness of the mask layer 35 is about 25 μm as one example.

Figure 5C:
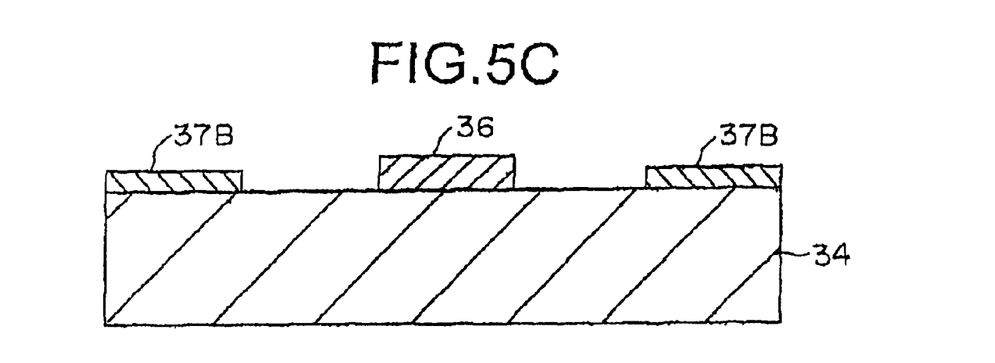

In FIG. 5C, the mask layer 35 on the substrate 34 in FIG. 5B is patterned to form a first mask layer 36 and expose the second mask layer 37B. The mask layer 35 is patterned by exposure and development for example. The diameter of the first mask layer 36 is about 100 µm to about 250 µm as one example.

Figure 5D:
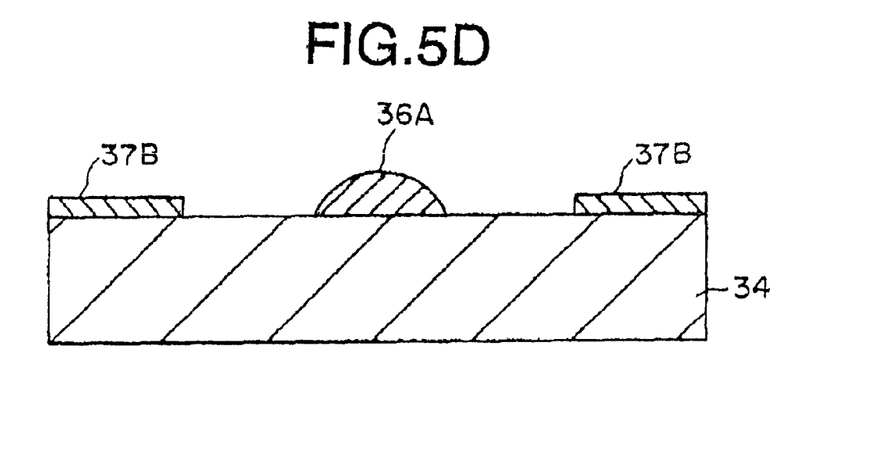

In FIG. 5D, the substrate 34 (or the first mask layer 36 on the substrate 34) in FIG. 5C is heat treated to make the first mask layer 36 deform so that its surface area becomes smaller because of surface tension and make it deform to a convex shape having a gently curved surface.

Due to the heat treatment, the mask layer 36 of FIG. 5C becomes the shape of a mask layer 36A of FIG. 5D. The mask layer 36A has a circular convex shape (i.e., a convex lens shape).

Figure 5E:
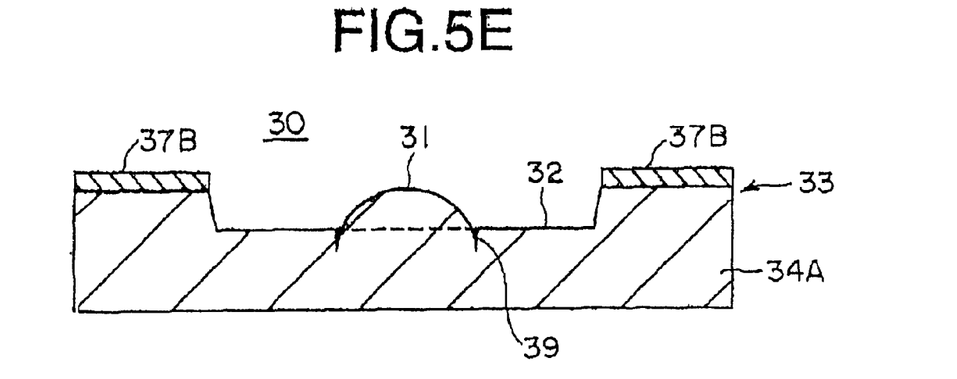

In FIG. 5E, the shape of the mask layer 36A of FIG. 5D is transferred to the substrate 34 to form a substrate 34A and form an optical element 30.

For example, RIE or other etching is used to transfer the shape of the mask layer 36A to the substrate 34 and form the optical element 30. The mask layer 37B is formed by material not etched or difficult to etch or small in etching rate at the time of etching to form the convex part 31. Further, in the etching to form the convex part 31, for example, an NLD apparatus or an ICP apparatus is used.

The convex part 31 is formed by transferring the shape of the mask layer 36A, a flat part 32 is formed by transferring the shape between the mask layers 36A and 37B, and an outer circumference part 33 is masked by the mask layer 37B and not etched. The surface of the outer circumference part 33 is flat or approximately flat.

A groove 39 is formed in an outer circumference of the convex part 31. This groove 39 clearly defines the boundary of the convex part 31 and the flat part 32.

According to the production method shown in FIGS. 5A to 5E, it is possible to form the convex part 31 functioning as a convex lens and form the thick outer circumference part 33. Further, since the precision of the patterning of the mask layer 35 can be maintained high, the convex part 31 and the outer circumference part 33 can be formed by a high positional accuracy. As a result, the thin flat part 32 positioned around the convex part 31 can be made smaller and for example the flat part 32 can be made narrower to the resolution of the photosensitive material.

Further, the thickness at the outer circumference part 33 can be made greater than the thickness at the convex part 31, so it is possible for the optical element 30 to be further improved in mechanical strength and to be further raised in the resonance frequency of the vibration in the thickness direction of the substrate 34A and thus made difficult to resonate.

Further, in the optical element 30, by having the thick outer circumference part 33 formed around the flat part 32 and using the production method in FIGS. 5A to 5E, it is possible to produce an optical element having a shape difficult to produce by a glass mold method.

Note that the second mask layer 37B in FIG. 5A can be formed by a lift-off method. This process of formation entails use of a remover for the photoresist, so if the mask layer 35 is an organic material such as a photosensitive material, it is desired to arrange the process of formation of the second mask layer 37B before the process of formation of the mask layers 35 and 36.

Further, the second mask layer 37B is desirably not processed in the processing of the substrate 34A of FIG. 5E, so as the process of FIG. 5E, RIE which makes use of a chemical reaction is preferable to ion milling.

In the production method in FIGS. 5A to 5E, as one example, the mask layer 25 is made using a material having a glass transition temperature (Tg point) of about 45° C. to about 55° C. such as PMER P-LA900PM made by Tokyo Ohka Kogyo Co., Ltd. or AZ PLP-30 or AZ PLP-40 made by Clariant and heat treated in a range of about 110° C. to about 150° C.

Further, in order to cause the first mask layer 36 to deform to a circular shape to a degree giving an optically smooth surface, the material of the mask layer 35 is made a material having a Tg point lower than the heat treatment temperature.

Furthermore, when forming the shape of the first mask layer 36 in the substrate 34 by dry etching or another process, it is necessary for the mask layer 36A not to change in quality after the heat treatment. Therefore, the heat treatment temperature is made a temperature at which the mask layer 36A does not change in quality. For example, the heat treatment temperature is made a temperature lower than a carbonization temperature of the first mask layer 36.

If the mask layer 36 deforms in a holding state of the substrate 34 on which the mask layers 36 and 37B are formed, reproduction of the process (reproducibility) becomes difficult. Further, if the mask layers 36 and 37B deform in the dry etching process, reproduction of the process becomes difficult.

For this reason, the material of the mask layer 35 is made a material having a Tg point higher than the storage temperature (room temperature or ordinary temperature) or processing temperature (near room temperature or near ordinary temperature).

From the viewpoint of the stability of the process, it is desired that the heat treatment temperature be a temperature higher than the Tg point by a certain margin.

That is, in order to cause the mask layer 36 to deform by the heat treatment so that its surface area becomes smaller (make the mask layer 36 a fluid state by the heat treatment and make the mask layer 36 deform by the surface tension of the mask layer 36), it is desired for the heat treatment temperature to be made 10's of degrees centigrade higher than the Tg point.

As one example, by making the heat treatment temperature a temperature at least about 40° C. higher than the Tg point, it is possible to cause the mask layer 36 to roundly deform within one hour for example and thus possible to produce the optical element 30 efficiently.

Note that, from a similar viewpoint, in the relation between the storage temperature or the processing temperature and the Tg point, the difference between the storage temperature or the processing temperature and the Tg point should be within several 10's of degrees centigrade.

Third Embodiment of Optical Element and of Method for Producing Optical Element Next, a third embodiment of an optical element and the method for producing the optical element as a third embodiment according to the present invention will be described with reference to FIGS. 6A to 6E.

Figure 6A:
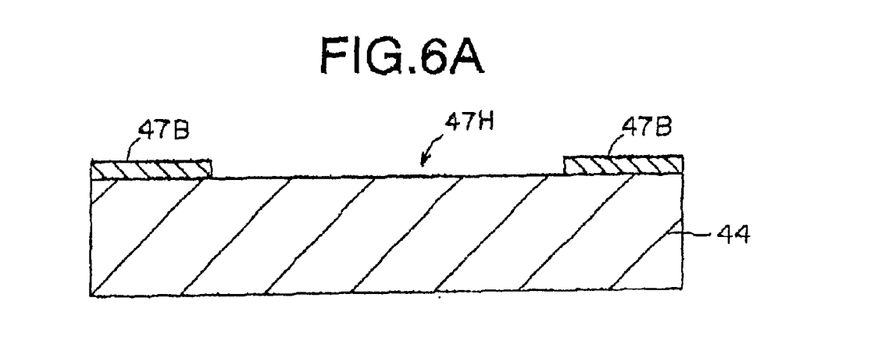
FIGS. 6A to 6E are explanatory views of a third embodiment of the method for producing an optical element according to the present invention.

In FIG. 6A, a third mask layer 47B having an opening 47H is formed on a substrate 44 formed by an optical material such as fused silica (fused silica-based glass). This third mask layer 47B is formed by an etching-resistant material. Its thickness is about 0.1 µm as one example. The third mask layer 57B may be formed, for example, by a metal material such as platinum or may be formed by a hard mask.

Figure 6B:
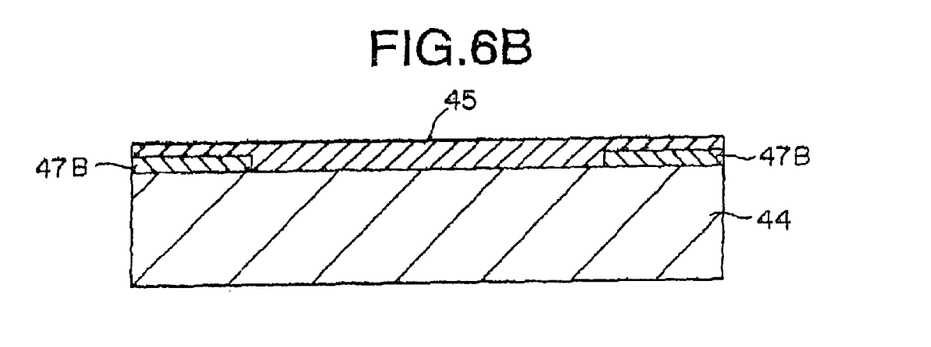

In FIG. 6B, a mask layer 45 is coated onto the substrate 44 of FIG. 6A. The mask layer 45 is formed by a photosensitive material (or photoresist) having a good characteristic for forming a thick film such as PMER P-LA900PM made by Tokyo Ohka Kogyo Co., Ltd. or AZ PLP-30 or AZ PLP-40 made by Clariant and is coated to a predetermined thickness by spin coating etc. The thickness of the mask layer 45 is about 25 μm as one example. Note that the mask layer 45 is made the same material as the mask layer 35.

Figure 6C:
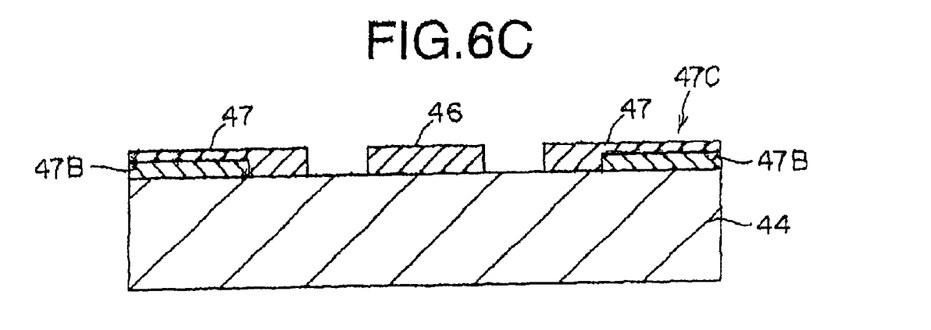

In FIG. 6C, the mask layer 45 on the substrate 44 of FIG. 6B is patterned to form a first mask layer 46 and a second mask layer 47C.

The second mask layer 47C has the third mask layer 47B and a fourth mask layer 47 superposed so as to cover this third mask layer 47B.

The fourth mask layer 47 is arranged closer to the mask layer 46 than the third mask layer 47B. The mask layer 45 is patterned by exposure and development for example. The distance between the first mask layer 46 and the second mask layer 47C is about 50 μm as one example, while the diameter of the first mask layer 46 is about 100 μm to about 250 μm as one example.

Figure 6D:
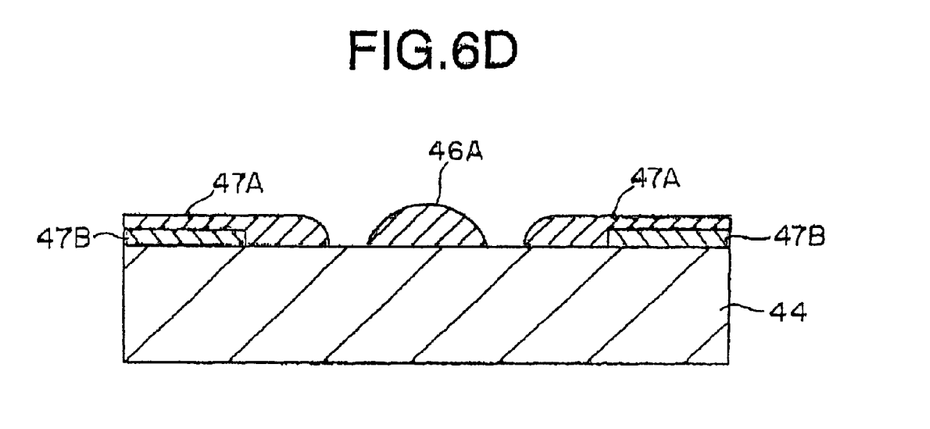

In FIG. 6D, the substrate 44 for the first and the second mask layers 46 and 47C on the substrate 44) of FIG. 6C is heat treated to make the mask layer 46 deform so that its surface area becomes smaller by surface tension and make it deform to a convex shape having a gently curved surface.

By the heat treatment, the mask layers 46 and 47 in FIG. 6C become the shapes of the mask layers 46A and 47A in FIG. 6D. The mask layer 46A has a circular convex shape (convex lens shape).

Figure 6E:
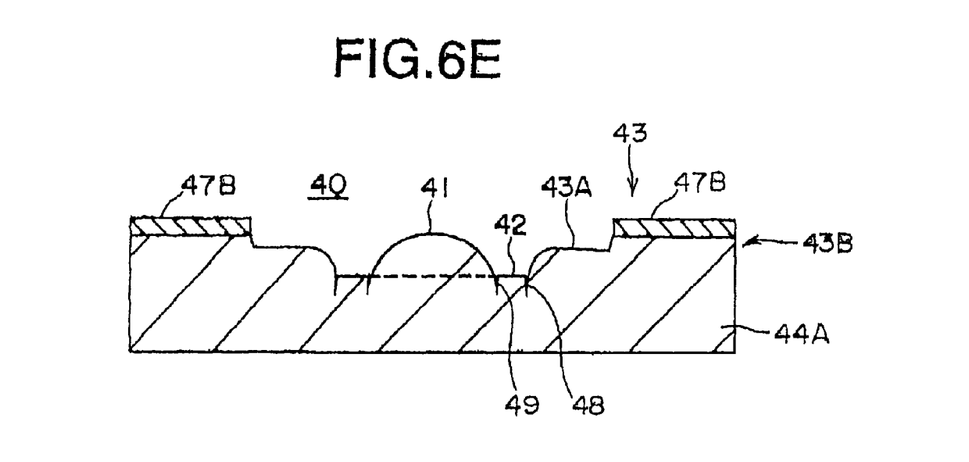

In FIG. 6E, the shapes of the mask layers 46A and 47A of FIG. 6D are transferred to the substrate 44 to form a substrate 44A and thus form an optical element 40. For example, RIE or other etching is used to transfer the shape of the mask layers 46A and 47A to the substrate 44 and thus forming the optical element 40. The mask layer 47B is formed by a material not etched or difficult to etched or small in etching rate at the time of etching to form a convex part 41. Further, in the etching to form the convex part 41, for example, an NLD apparatus or an ICP apparatus is used.

The convex part 41 is formed by transferring the shape of the mask layer 46A, while a flat part 42 is formed by transferring the shape between the mask layers 46A and 47A.

An outer circumference part 43 has a first outer circumference part 43A at an inner side and a second outer circumference part 43B at an outer side. The thickness of the first outer circumference part 43A is smaller than that of the second outer circumference part 43B and thus steps (two steps) are formed. Further, the second outer circumference part 43B is masked by the mask layer 47B and not etched. The surfaces of the first and the second outer circumference part 43A and 43B are flat or approximately flat.

A groove 49 is formed at an inner circumference of the flat part 42, while a groove 48 is formed at an outer circumference of the flat part 42. The grooves 48 and 49 clearly define the convex part 41, the flat part 42, and the outer circumference part 43.

According to the production method shown in FIGS. 6A to 6E, it is possible to form the convex part 41 functioning as a convex lens and to form the thick outer circumference part 43. Further, since the precision of the patterning of the mask layer 45 can be maintained high, the convex part 41 and the outer circumference part 43 can be formed with a high positioning accuracy. Due to this, the thin flat part 42 positioned around the convex part 41 can be made small and for example the flat part 42 can be made narrow to the resolution of the photosensitive material.

Further, since the outer circumference part 43 (the second outer circumference part 43B) can be made thicker than the convex part 41, it is possible to further improve the mechanical strength of the optical element 40 and to further raise the resonance frequency of the vibration in the thickness direction and thus possible to make the optical element 40 a structure difficult to resonate.

Since the optical element 40 in FIG. 6E has the first outer circumference part 43A near the convex part 41 formed thinner than the second outer circumference part 43B, it has a structure difficult to block the optical path and has a structure possible to prevent so called eclipse.

Further, due to such a structure, in comparison with the optical element 30 in FIG. 5E, the outer circumference part can be formed nearer to the convex part and therefore it is possible to further improve the mechanical strength and to further raise the resonance frequency.

Furthermore, in the optical element 40, the thicker part 43 is formed around the flat part 42 and by using the production method in FIGS. 6A to 6E, it is possible to produce the optical element having a shape difficult to produce by a glass mold method.

Optical Pickup

Figure 7:
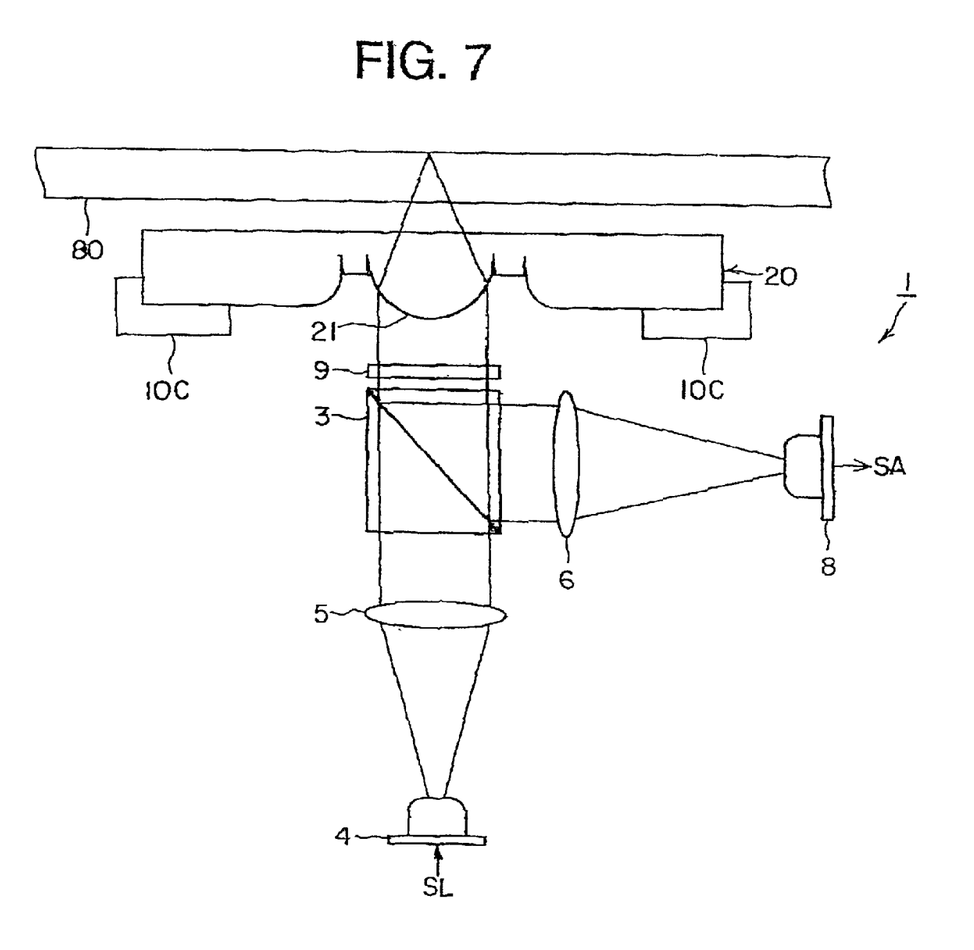
FIG. 7 is a structural view of a first embodiment of an optical pickup having an optical element according to the present invention.

FIG. 7 is a structural view of a first embodiment of an optical pickup having the optical element, according to the present invention.

This pickup 1 has a laser diode 4, a collimator lens 5, a beam splitter 3, a ¼ wavelength plate (a λ/4 plate) 9, a condenser lens 6, a photodetector 8, and the optical element 20. This optical element 20 may also be configured as a slider attached to an arm or configured to move in a focus direction and a tracking direction by a bi-axial actuator.

The laser diode 4 outputs a laser beam comprised of linearly polarized light in response to a drive signal SL and supplies the output laser beam to the collimator lens 5.

The collimator lens 5 makes the laser beam from the laser diode 4 parallel light and supplies it to the beam splitter 3.

The beam splitter 3 passes the laser beam from the collimator lens 5 and supplies the laser beam to the convex part 21 of the optical element 20 via the ¼ wavelength plate 9.

The convex part 21 of the optical element 20 functions as an object lens, condenses the laser beam from the ¼ wavelength plate 9 and the beam splitter 3, and supplies it to a track of an optical disc 80. Thus, the laser beam from the laser diode 4 is focused on a recording surface of the optical disc 80.

Further, the optical element 20 receives the laser beam reflected at the optical disc 80 and returns the same to the beam splitter 3 via the ¼ wavelength plate 9.

The beam splitter 3 receives the laser beam from the optical element 20, and directs to the condenser lens 6.

The condenser lens 6 condenses the laser beam from the beam splitter 3 and supplies the condensed laser beam to the photodetector 8.

The photodetector 8 receives the laser beam from the condenser lens 6 at a receiving part and generates an output signal SA. The photodetector 8 is configured by, for example, a four division photodetector which generates signals for calculating a tracking error signal, a focus error signal, an RF signal or other signal.

In the optical pickup in FIG. 7, by using the optical element 20, it is possible to raise the resonance frequency in comparison with an optical pickup using the optical element 10 in FIGS. 1A and 1B and thus it is possible to record and/or reproduce data by a high transfer rate. Further, by using the optical element 20, it is possible to improve the mechanical strength and reliability of the optical pickup.

Figure 8:
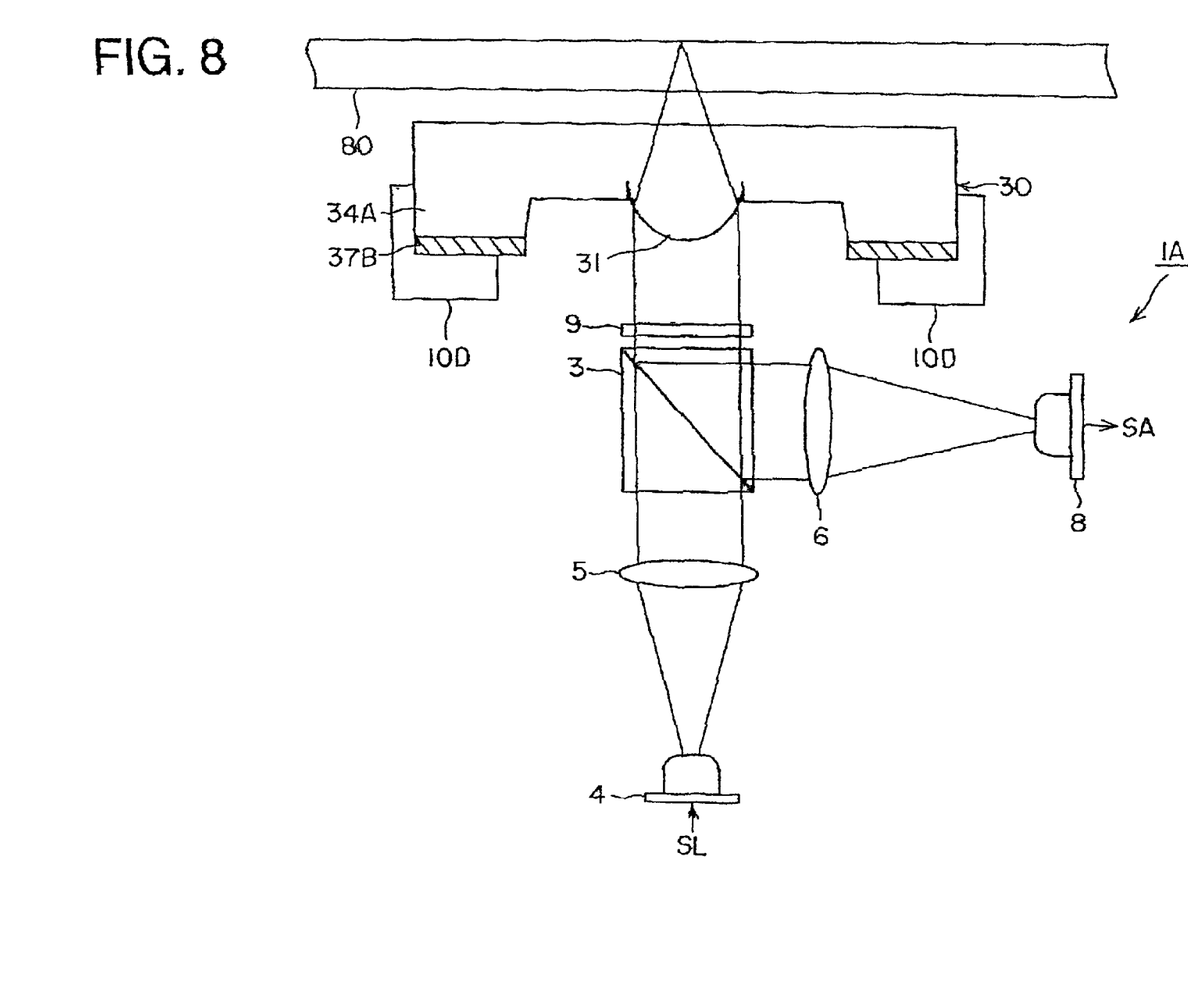
FIG. 8 is a structural view of a second embodiment of an optical pickup having an optical element according to the present invention.

FIG. 8 is a structural view of a second embodiment of an optical pickup having the optical element 30, according to the present invention.

This optical pickup 1A has the optical element 30 instead of the optical element 20 used in the optical pickup 1 shown in FIG. 7. The rest of the configuration is the same as that of the optical pickup 1.

Figure 9:
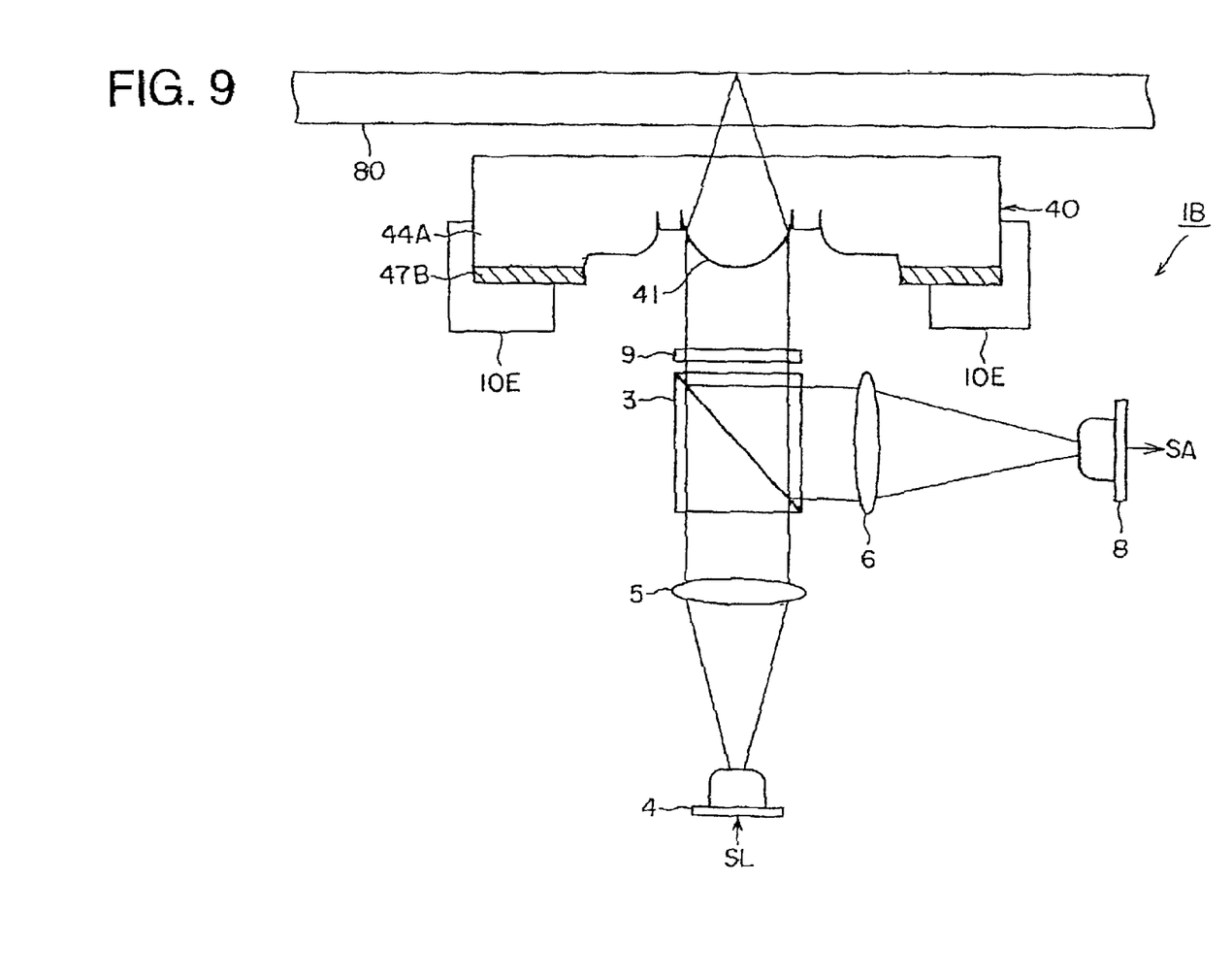
FIG. 9 is a structural view of a third embodiment of an optical pickup having an optical element according to the present invention.

FIG. 9 is a structural view of a third embodiment of an optical pickup having the optical element 40, according to the present invention.

This optical pickup 1B has the optical element 40 instead of the optical element 20 used in the optical pickup 1 shown in FIG. 7. The rest of the configuration is the same as that of the optical pickup 1.

In embodiments of the present invention, by using fused silica (fused silica-based glass) for example as the optical substrate, the optical element and the optical pickup with a refractive index of about 1.46, an NA of about 0.85 (when forming two group lenses), and having a resonance frequency raised to about 400 kHz to about 700 kHz can be produced. Note that the resonance frequency of the related art of the optical element is about 100 kHz to about 250 kHz.

For example, in the optical element 10 as the related art shown in FIG. 1A, when a radius of curvature $R_1$ of the convex part 11 is 150 micron, $\phi_1$ is 200 micron, $L_1$ is 1200 micron, and $t_1$ is 30 micron, a resonance frequency 227 kHz is obtained by a computer simulation. Further, for example, in the optical element 20 of one embodiment of the present invention shown in FIG. 3A, when a radius of curvature $R_2$ of the convex part 21 is 150 micron, $\phi_2$ is 200 micron, $\phi_3$ is 400 micron, $L_2$ is 1200 micron, $t_2$ is 30 micron, and $t_3$ is 80 micron, a resonance frequency 630 kHz is obtained by a computer simulation.

The optical element produced by the production method of the present invention and the optical pickup using the optical element as an object lens can be utilized for recording and/or reproducing in an optical disc apparatus and a magnet-optical disk apparatus using not only an optical disc but also various other kinds of storage media such as a compact disc (CD), digital versatile disc (DVD), mini disc (MD), or magnetic optical (MO) disc.

Note that the above embodiments are merely examples of the present invention. The present invention is not limited to the above embodiments.

What is claimed is:

1. An optical element having a substrate formed by an optical material, said substrate comprising:

a convex part functioning as a convex lens;

a flat part positioned around said convex part; and an outer circumference part positioned around said flat part, wherein a thickness of said outer circumference part is greater than that of said flat part, and greater than said convex part, whereby the mechanical strength is improved and the resonance frequency is increased, wherein said substrate comprises a first groove formed at a boundary between said convex part and said flat part, for defining a region of said convex part.

2. An optical element as set forth in claim 1, wherein said substrate comprises a second groove formed at a boundary between said flat part and said outer circumference part, for defining a region of said flat part.

3. An optical element having a substrate formed by an optical material, said substrate comprising:

a convex part functioning as a convex lens;

a flat part positioned around said convex part; and an outer circumference part positioned around said flat part, wherein a thickness of said outer circumference part is greater than that of said flat part, and greater than said convex part, whereby the mechanical strength is improved and the resonance frequency is increased, wherein said optical material comprises fused silica.

4. An optical element having a substrate formed by an optical material, said substrate comprising:

a convex part functioning as a convex lens;

a flat part positioned around said convex part; and an outer circumference part positioned around said flat part, wherein a thickness of said outer circumference part is greater than that of said flat part, and greater than said convex part.

whereby the mechanical strength is improved and the resonance frequency is increased, wherein a plurality of steps are formed at said outer circumference part, the thickness of said substrate at an outer side step is thicker than that of said substrate at an inner side step, and thereby eclipse is prevented.

5. An optical element having a substrate formed by an optical material, said substrate comprising:

a convex part functioning as a convex lens;

a flat part positioned around said convex part;

an outer circumference part positioned around said flat part;

a first groove formed at a boundary between said convex part and said flat part, for defining a region of said convex part; and a second groove formed at a boundary between said flat part and said outer circumference part, for defining a region of said flat part, wherein a thickness of said outer circumference part is greater than that of said flat part;

both said flat part and said outer circumference part comprise flat shapes in the thickness direction; and said convex part, said flat part, and said outer circumference part are integrated in a unit by said substrate.

6. An optical element having a substrate formed by an optical material, said substrate comprising:

a convex part functioning as a convex lens;

a flat part positioned around said convex part;

an outer circumference part positioned around said flat part; and a groove formed at a boundary between said convex part and said flat part, for defining a region of said convex part, wherein a thickness of said outer circumference part is greater than that of said convex part;

both said flat part and said outer circumference part comprise flat shapes in the thickness direction; and said convex part, said flat part, and said outer circumference part are integrated in a unit by said substrate.

7. An optical element having a substrate formed by an optical material, said substrate comprising:

a convex part functioning as a convex lens;

a flat part positioned around said convex part;

a first outer circumference part positioned around said flat part;

a second outer circumference part positioned around said first outer circumference part;

a first groove formed at a boundary between said convex part and said flat part, for defining a region of said convex part; and a second groove formed at a boundary between said flat part and said first outer circumference part, for defining a region of said flat part, wherein a thickness of said first and second outer circumference parts are greater than that of said flat part and the thickness of said second outer circumference part is greater than that of said first outer circumference part;

all said flat part and said first and second outer circumference parts comprise flat shapes in the thickness direction; and said convex part, said flat part, and said first and second outer circumference parts are integrated in a unit by said substrate.

8. An optical pickup comprising:

an optical element functioning as an object lens when mounted on a recording and/or reproducing apparatus of an optical storage medium and a photodetector for receiving a reflected light beam for use in recording and/or reproduction to and from the optical storage medium, the optical element comprising a substrate formed by an optical material, the substrate comprising a convex part functioning as a convex lens, a flat part positioned around the convex part, and an outer circumference part positioned around the flat part, a thickness of the outer circumference part being thicker than that of the flat part to thereby improve mechanical strength and increase a resonance frequency, wherein a plurality of steps are formed at said outer circumference part, the thickness of said substrate at an outer side step is greater than that of said substrate at an inner side step, and thereby eclipse is prevented.

9. An optical element having a substrate formed by an optical material, said substrate comprising:

a convex pan functioning as a convex lens;

a flat part positioned around said convex part; and an outer circumference part positioned around said flat part, wherein a thickness of said outer circumference part is greater than that of said flat part, and wherein said substrate comprises a first groove formed at a boundary between said convex part and said flat part, for defining a region of said convex part.

10. An optical element as set forth in claim 9, wherein the thickness of said outer circumference part is greater than that of said convex part.

11. An optical element as set forth in claim 9, wherein said substrate comprises a second groove formed at a boundary between said flat part and said outer circumference part, for defining a region of said flat part.

12. An optical element as set forth in claim 9, wherein said optical material comprises fused silica.

13. An optical element as set forth in claim 9, wherein a surface of said outer circumference part is flat or approximately flat and thereby holding is eased.

14. An optical element as set forth in claim 9, wherein a plurality of steps are formed at said outer circumference part, the thickness of said substrate at an outer side step is thicker than that of said substrate at an inner side step, and thereby eclipse is prevented.

15. An optical element having a substrate formed by an optical material, said substrate comprising:

a convex part functioning as a convex lens;

a flat part positioned around said convex part; and an outer circumference part positioned around said flat part, wherein a thickness of said outer circumference part is greater than that of said flat part, wherein said optical material comprises fused silica.

16. An optical element having a substrate formed by an optical material, said substrate comprising:

a convex part functioning as a convex lens;

a flat part positioned around said convex part; and an outer circumference part positioned around said flat part, wherein a thickness of said outer circumference part is greater than that of said flat part, wherein a plurality of steps are formed at said outer circumference part, the thickness of said substrate at an outer side step is thicker than that of said substrate at an inner side step, and thereby eclipse is prevented.

17. An optical element as set forth in claim 16, wherein said substrate comprises a first groove formed at a boundary between said convex part and said flat part, for defining a region of said convex part.

* * * * *